UNITED STATES PATENT OFFICE.

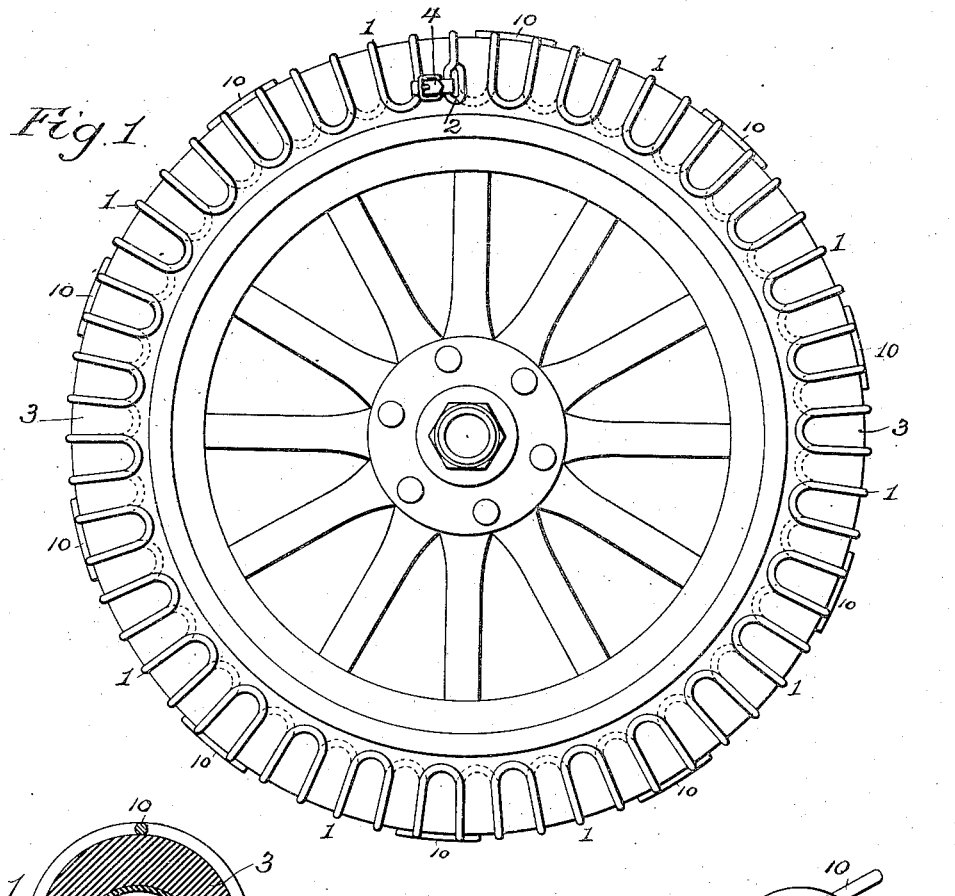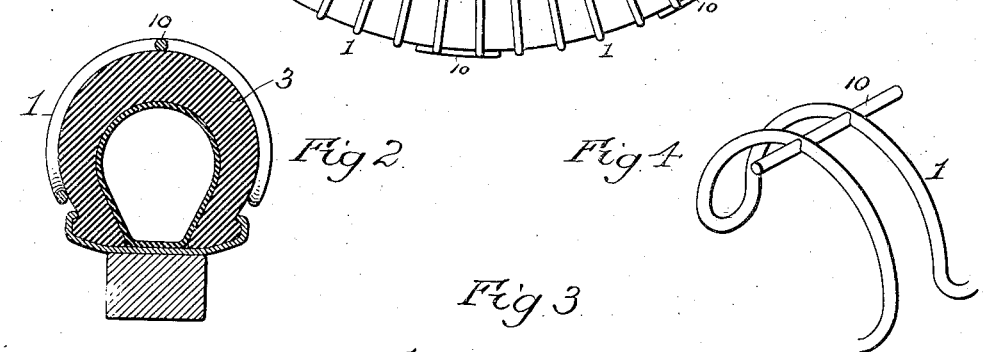

GEORGE A. LYON, OF PHILADELPHIA, PENNSYLVANIA.

ANTISKIDDING ATTACHMENT FOR WHEEL-TIRES.

No. 924,806.    Specification of Letters Patent.    Patented June 15, 1909.

Application filed March 18, 1907. Serial No. 362,870.

*To all whom it may concern:*

Be it known that I, GEORGE A. LYON, a citizen of the United States, residing in Philadelphia, Pennsylvania, have invented certain Improvements in Antiskidding Attachments for Wheel-Tires, of which the following is a specification.

The object of my invention is to provide a cheap, simple and effective device for preventing the skidding of wheels of vehicles, said device being readily applicable to or removable from the tire of the wheel, but being firmly retained in position on the tire after its application thereto. This object I attain in the manner hereinafter set forth, reference being had to the accompanying drawing, in which—

Figure 1 is a side view of a wheel provided with my improved device for preventing skidding of the same; Fig. 2 is a transverse section of part of the rim and tire of the wheel with the device applied thereto; Fig. 3 is a side view of part of the wheel illustrating a certain feature of my invention; and Fig. 4 is a perspective view of part of the device.

In making the anti-skidding attachment shown in Figs. 1 and 2 I first bend into serpentine form a wire 1, preferably of steel or other resilient material, and form an eye 2 at each end of the wire. The serpentine strip thus produced is then bent over a mandrel to form a split ring which is, by preference, slightly less in circumference than the tire of the wheel for which the attachment is intended, whereby, when said attachment is removed from the mandrel, it will have a normal tendency to assume the ring form, but its ends can be readily separated from one another in order to permit of its ready application to or removal from the wheel, the ends of said split tire 3 of the wheel, the ends of said split ring, after such application, being secured together by any suitable means, such for instance as a strap 4 on each side of the tire. Owing to the fact that the ring is slightly less in circumference than the tire, this securing together of the ends of the ring will correspondingly stretch the same, and the resiliency of the ring will therefore be exerted to cause it to cling tightly to the tire. Each waved member of the strip composing the ring is of such extent as to constitute a yoke, embracing more than one-half the diameter of the tire and each of said members is pressed inwardly so that it has a tendency to slightly underlap the tire, as shown in Fig. 2, and to remain in this position owing to the resiliency of the wire, whereby the attachment is self-retaining on the tire, although if it is desired to resist excessive strain upon the attachment and to prevent the same from slipping circumferentially around the tire opposite members of the ring may be connected at different points throughout the wheel by suitable transverse ties, such for instance as the straps 5 illustrated in Fig. 1.

A continuous ring composed of serpentine wire and otherwise constructed in accordance with my invention may, if desired, be used, the upper part of such a ring being shown in Fig. 3 but, as this would necessitate the deflating of the tire in order to permit of the application of the ring thereto, the use of the split ring having separable connections is preferred.

In some cases I provide transverse members of the serpentine wire, as shown in Fig. 1, with projecting bars at an angle thereto, thereby providing additional surfaces to resist skidding action, the bars 10 being so disposed on the serpentine wire as not to unduly detract from the elasticity of the same in case they are connected, as shown.

An attachment such as that forming the subject of my invention has no metal parts in contact, to rub and wear upon one another, and being of the same thickness throughout, it prevents excessive pressure or wear upon any particular portion of the tire such as results when one portion of the attachment is thicker than another on the tread of the tire.

I claim—

1. A wheel tire attachment consisting of a ring composed of a single serpentine wire surrounding the tire.

2. A wheel tire attachment consisting of a ring composed of a serpentine wire surrounding the tire and having its composite members bent inwardly so as to underlap the tire.

3. A wheel tire attachment consisting of a split ring composed of serpentine wire, said ring surrounding the tire but being normally of slightly less circumference than said tire, and detachable fastenings connecting the ends of said split ring and serving to stretch and impart tension thereto.

4. A wheel tire attachment consisting of a ring composed of serpentine wire partially embracing the tire, one or more transverse members of the serpentine wire being provided with a bar projecting at an angle thereto and located at the tread portion of the tire.

In testimony whereof, I have signed my name to this specification, in the presence of two subscribing witnesses.

GEORGE A. LYON.

Witnesses:
HAMILTON D. TURNER,
KATE A. BEADLE.